United States Patent [19]

Suzuki

[11] Patent Number: 4,833,703
[45] Date of Patent: May 23, 1989

[54] ON-HOOK CONTROL CIRCUIT FOR ANSWERING MACHINE

[75] Inventor: Chiaki Suzuki, Ohmiya, Japan

[73] Assignee: Asahi Electronics Co., Ltd., Japan

[21] Appl. No.: 81,666

[22] Filed: Aug. 4, 1987

[30] Foreign Application Priority Data

Jun. 9, 1987 [JP] Japan .................. 62-88932[U]

[51] Int. Cl.⁴ .................................... H04M 1/65
[52] U.S. Cl. .............................. 379/67; 379/82; 379/373
[58] Field of Search .............. 379/82, 373, 393, 67

[56] References Cited

U.S. PATENT DOCUMENTS

| 4,074,081 | 2/1978 | Humm | 379/82 |
| 4,444,999 | 4/1984 | Sparrevohn | 379/195 |
| 4,484,036 | 11/1984 | Lyle et al. | 379/351 |
| 4,496,797 | 1/1985 | Price | 379/412 |

FOREIGN PATENT DOCUMENTS

| 0154762 | 8/1985 | Japan | 379/82 |
| 2092411 | 8/1982 | United Kingdom | 379/82 |

Primary Examiner—Thomas W. Brown
Attorney, Agent, or Firm—Jordan B. Bierman

[57] ABSTRACT

Control circuit for an answering machine having an electrical unit in parallel therewith including a controller for causing a first photocoupler to be conductive for a predetermined time period to discharge a capacitor when the machine goes into an on line state and, thereafter, causing the voltage across the telephone lines to charge the capacitor via a rectifier unit; a second photocoupler for detecting a voltage drop across the telephone lines caused by picking up said unit while the machine is in its on line state while using the voltage across the capacitor as a reference, whereby the controller returns the machine to its standby state after a predetermined time from the occurrance of the voltage drop.

9 Claims, 2 Drawing Sheets

ON-HOOK CONTROL CIRCUIT FOR ANSWERING MACHINE

FIELD OF THE INVENTION

The present invention relates to a control circuit for an answering machine for automatically returning the machine to the standby state when another device, connected in parallel with the machine, is placed on line while the machine is in its answering state. While applicable to other areas, the present invention will be described as a telephone answering machine.

It has been long desired to allow a telephone, connected in parallel with an answering machine, to take priority over the machine when the former is picked up while the latter is still on line. In this case, various control circuits are required for electrically detecting the on line signal of the telephone and returning the machine to its standby state. This has been done through the detection of the voltage drop across the telephone lines caused when the parallel telephone is picked up.

The dc voltage of telephone lines changes with the line conditions and is not always constant; i.e. it varies in the range of 3 to 11 volts. Thus, for the conventional control for an answering machine, it is very difficult to distinguish a line voltage drop of 1 volt, which is all that results from picking up the parallel telephone. Further, in order to conform to the requirements of the FCC, etc. telephone lines and the answering machine must be electrically isolated while an on line electrical signal is sent to the controller (microprocessor).

SUMMARY OF THE INVENTION

The present invention has been made in consideration of the above problems and seeks to provide a standby control circuit for a telephone answering machine capable of reliably detecting the pick-up of a parallel telephone. This is based on the change in the amount of light received by a photocoupler; at the same time, the device conforms to the applicable telephone requirements.

According to the present invention, the controller causes a first photocoupler to become conductive for a predetermined period when the answering machine is placed on line. Thereafter, the telephone line voltage is charged into a capacitor through a rectifier unit. The voltage across the capacitor is used as a reference to which a second photocoupler compares the telephone line voltage to identify the drop caused by the telephone coming on line. After the voltage drop has continued for a predetermined time, the controller returns the machine to the standby state.

With the controller circuit as described above, the first photocoupler is made conductive so as to discharge the capacitor when a machine is on line. This eliminates the effect of any "noise" on the line. Thereafter, the capacitor is charged by the telephone line voltage to a preset potential. The voltage across the capacitor is used as a reference for a second photocoupler to detect the telephone line voltage drop caused by picking up the telephone. As a result, even through the telephone line voltage fluctuates, the line voltage drop resulting from the telephone coming on line can be reliably detected by comparison with the voltage across the capacitor whose potential changes in accordance with the actual telephone line voltage.

DETAILED DESCRIPTION OF THE INVENTION

Figure 1:
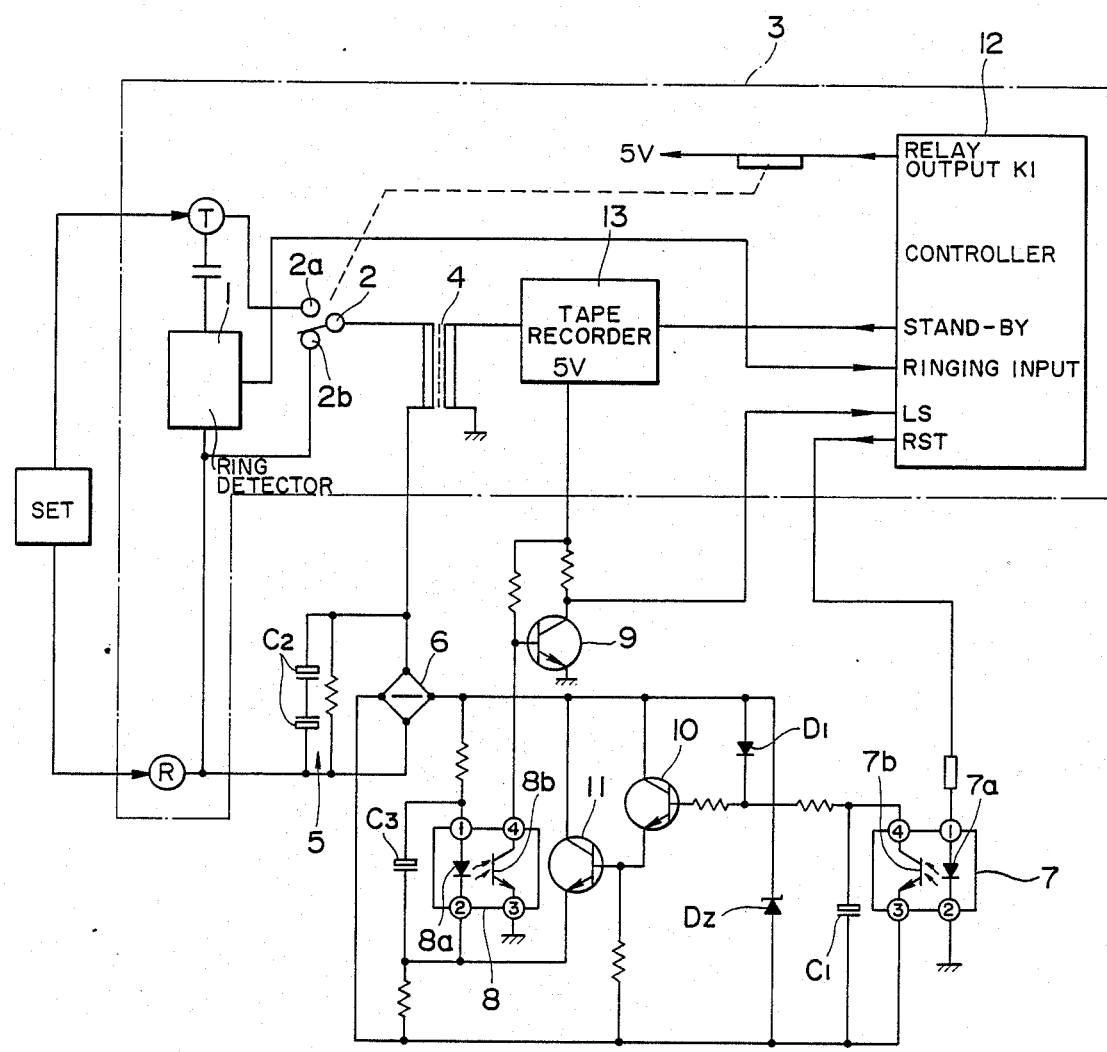
FIG. 1 is a circuit diagram showing an embodiment of the standby control circuit for a telephone answering machine according to the present invention.

Answering machine 3 comprises ring detector 1, relay switch 2, transformer 4, controller 12, and tape recorder 13. Telephone lines T and R are connected to ring detector 1. Relay switch 2 has standby contact 2b which is connected while answering machine 3 is in its standby state. A recording/reproducing tape recorder 13 is connected via transformer 4 to telephone lines T and R. High-pass filter 5 comprises resistor R8 and a capacitors C2. Diode bridge 6 serves to rectify the dc voltage from telephone lines T and R. First photocoupler 7 has light receiving element 7b connected through diode D1 and resistor R1 across the output terminals of diode bridge 6. Light emitting element 7a of first photocoupler 7 is connected to a control output terminal (RST terminal) of controller 12 which includes a microprocessor.

Capacitor C1 is in parallel with light receiving element 7b of first photocoupler 7 which controls the charge/discharge of capacitor C1. Constant voltage diode Dz is connected in parallel with diode D1, resistor R1 and capacitor C1. Second photocoupler 8 has its light emitting element 8a connected via resistors R2 and R3 across the output terminals of diode bridge 6, while its light receiving element 8b is connected at one end to a 5 V voltage terminal of tape recorder 13 via rsistor R4. Transistor 9 has its base connected to the interconnection between light receiving element 8b and resistor R4, its collector connected via resistor R5 to the 5 V voltage terminal, and its emitter connected to ground. The collector is connected to a control input terminal (LS terminal) of controller 12.

Transistor 10 has its collector connected to the positive output terminal of diode bridge 6, its emitter connected via resistor R6 to the negative output terminal of diode bridge 6, and its base via a resistor R7 to diode D1.

Transistor 11 has its collector connected to the positive output terminal of diode bridge 6, its emitter connected to the interconnection between light emitting element 8a and resistor R3, and its base connected to the emitter of transistor 10. Also provided are capacitor C3 and resistor R6.

When answering machine 3 is in its standby mode, relay switch 2 contacts contact 2b and first and second photocouplers 7 and 8 are in an idle state; the voltage across capacitor C1 is zero and transistor 9 is turned on. The control output and input terminals RST and LS are maintained at zero volts.

Figure 2:
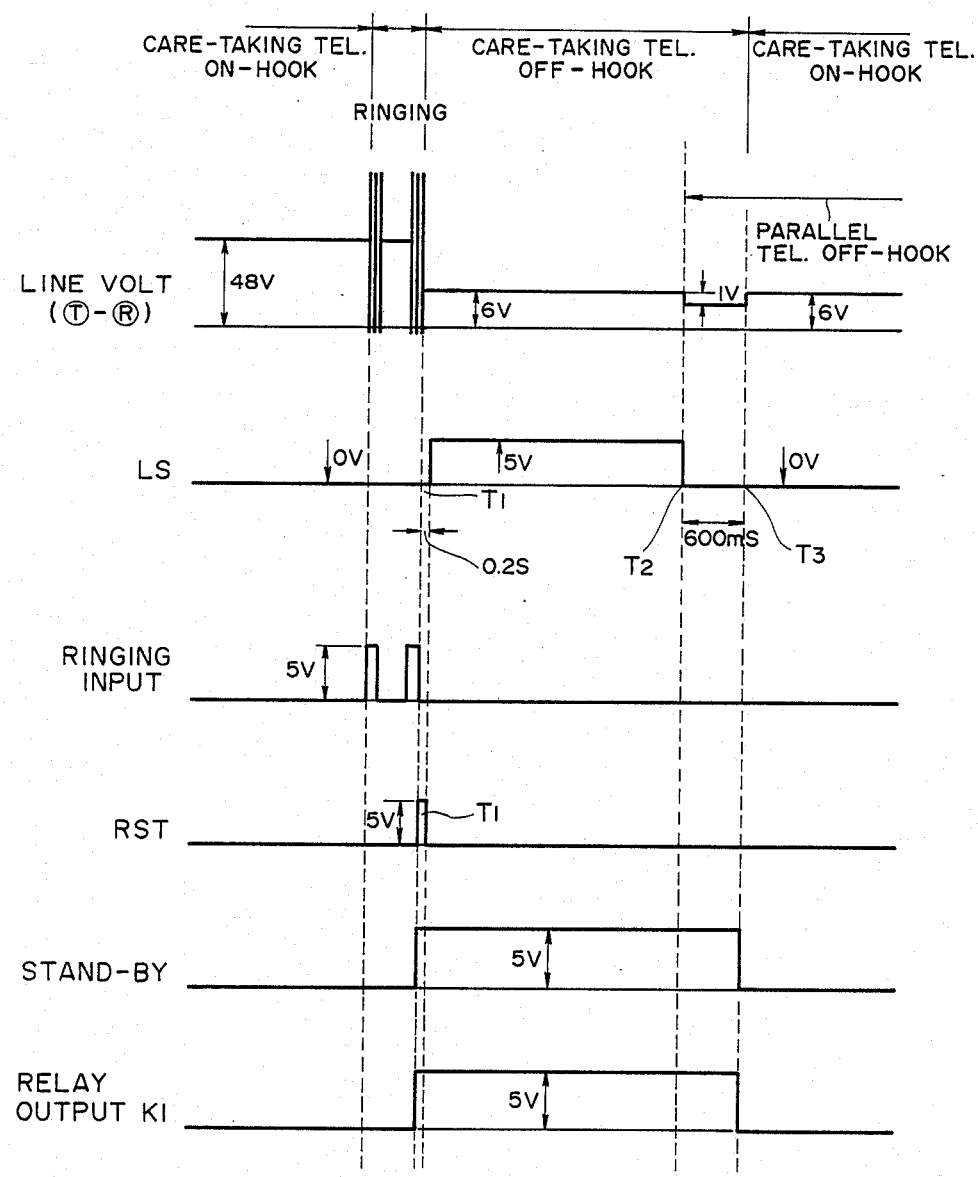
FIG. 2 is a timing chart showing the signal waveforms at the main circuit portion of the embodiment shown in FIG. 1.

During the above standby mode, when a ringing signal inputter from telephone lines T and R is detected by controller 12 via ring detector 1, a high level signal "H" is outputter from relay output terminals K1. The high level signal "H" energizes a coil so that relay switch 2 shifts to contact 2a and, at the same time, the output signal from the standby terminal is high level. Machine 3 is now in its on line, i.e. response, state. Controller 12 then outputs from its RST terminal a high level signal "H" for time period T1 of 0.2 seconds as shown in FIG. 2. As a result, light emitting element 7a is activated to lower the impedance of light receiving element 7b. With first photocoupler in this conductive state, capacitor C1 is discharged so that undesired voltage and the like which might be generated on telephone lines T and R is drained away. This prevents such "noise" from being sent to the telephone on line detector and thus eliminates a possible malfunction. After discharging capacitor C1, the voltage on telephone lines T and R is applied to capacitor C1 to charge it, by way of relay switch 2, diode bridge 6, diode D1, and resistor R1.

In the meantime, current flows via telephone lines T and R and resistor R2 to light emitting element 8a of second photocoupler 8 and resistor R3. This lowers the impedance of light receiving element 8b and the base potential of transistor 9. As a result, the collector potential is transistor 9 is changed from low level to high level so that the voltage at the control input terminal LS of controller 12 is raised to 5 V, as shown in FIG. 2.

In this condition, when the telephone is parallel with machine 3 is picked up at time T2, the voltage across the telephone lines T and R drops from 6 V to 5 V as shown in FIG. 2. As a result, the voltage applied to light emitting element 8a of second photocoupler 8 is also lowered. Even in such a case, the cathode potential of light emitting element 8a is maintained constant by means of the circuit comprising capacitor C1, resistor R1, resistor R7, transistors 10 and 11, and resistor R3. Therefore, the voltage drop across telephone lines T and R can be detected accurately using the constant cathode potential as a reference value.

Particularly, the impedance of light receiving element 8b becomes accordingly high due to the voltage drop across the telephone lines to eventually make transistor 9 turn on. Therefore, the voltage at control input terminal LS of the controller 12 becomes low again. If controller 12 judges that the predetermined time (e.g., 600 ms) has elapsed since the voltage at control input terminal LS became low; i.e., since the parallel telephone set was picked up, it automatically switches answering machine 3 from the on line mode to the standby mode and allows speech on the parallel telephone. Immediately after the predetermined time lapse, the voltage across the telephone lines returns to 6 V as shown in FIG. 2. Therefore, if the telephone is picked up while the answering machine is responding to a call, it automatically takes priority and the machine is returned to its standby condition, thus allowing the user to directly respond to the call.

The controller circuit makes the first photocoupler conductive for a predetermined time period after the answering machine is placed in its on line state and, thereafter, the telephone line voltage is charged through the rectifier unit to the capacitor. The voltage drop caused when the telephone is picked up during the on line state is detected by the second photocoupler using the voltage across the capacitor as a reference value. After the predetermined time from the voltage drop has elapsed, the controller circuit returns the machine to the standby condition. As a result, even if the dc voltage across the telephone lines fluctuates, the voltage drop can be reliably detected using the capacitor voltage, which maintains a level corresponding to the dc voltage at that time as a reference value. In addition, use fo the first and second photocouplers enables electrical isolation between the telephone lines and the answering machine with its controller, thus avoiding any adverse effects upon the telephone lines and complying with the appropriate regulations.

I claim:

1. A control circuit for an answering machine, which machine has a standby state and an on line state, and is adapted to switch from said standby state to said on line state when its input line is activated and to return to said standby state when said machine has completed its function, an electrical unit in parallel with said machine and connected to said input line, said unit adapted to be used when said machine is in said standby state, said control circuit comprising a first photocoupler adapted to detect and store a reference voltage from said input line, a second photocoupler adapted to detect and store a present voltage from said input line, means for comparing said reference voltage and said present voltage, said control circuit adapted to cause said line voltage is charge a first capacitor to said reference voltage, said control circuit adapted to detect a voltage drop in said input line by comparing said reference voltage with said present voltage and to return said machine to said standby state when said voltage drop, indicating that said unit is on line, occurs.

2. The circuit of claim 1 wherein said machine is a telephone answering machine and said unit is a telephone.

3. The circuit of claim 1 wherein said control circuit is adapted to discharge said first capacitor after said machine has gone to said on line state and before said first capacitor has been charged.

4. The circuit of claim 1 wherein said control circuit is adapted to return said machine to said standby state after a predetermined time has elapsed.

5. The circuit of claim 1 wherein said first photocoupler is in parallel with said first capacitor.

6. The circuit of claim 1 wherein said first capacitor is charged through a rectifier.

7. The circuit of claim 6 wherein said rectifier is a diode bridge.

8. The circuit of claim 3 wherein said first photocoupler comprises a first light emitting element adapted to be activated by said reference voltage, a first light receiving element having an impedance, whereby said impedance of said first receiving element is reduced when emitted light falls on said first receiving element.

9. The circuit of claim 3 wherein said second photocoupler comprises a second light emitting element adapted to be activated by said present voltage, a second light receiving element having an impedance, whereby said impedance of said second receiving element is reduced when emitted light falls on said second receiving element.

* * * * *